(12) United States Patent
Rozenwald et al.

(10) Patent No.: US 10,671,588 B2
(45) Date of Patent: Jun. 2, 2020

(54) MULTIPLE DATABASE UPDATES USING PATHS

(71) Applicant: eBay Inc., San Jose, CA (US)

(72) Inventors: Guy Rozenwald, Netanya (IL); Roman Goldberg, Atlit (IL); Amit Gottlieb, Tel Aviv (IL); Amir Harel, Netanya (IL)

(73) Assignee: eBay Inc., San Jose, CA (US)

( * ) Notice: Subject to any disclaimer, the term of this patent is extended or adjusted under 35 U.S.C. 154(b) by 515 days.

(21) Appl. No.: 15/206,025

(22) Filed: Jul. 8, 2016

(65) Prior Publication Data
US 2018/0011887 A1  Jan. 11, 2018

(51) Int. Cl.
*G06F 16/23* (2019.01)
*G06F 16/25* (2019.01)
*G06F 16/245* (2019.01)
*G06F 16/901* (2019.01)

(52) U.S. Cl.
CPC ............ *G06F 16/23* (2019.01); *G06F 16/245* (2019.01); *G06F 16/25* (2019.01); *G06F 16/9024* (2019.01)

(58) Field of Classification Search
CPC ......... G06F 17/30958; G06F 17/30424; G06F 17/30545; G06F 17/30557; G06F 16/23; G06F 16/245; G06F 16/9024; G06F 16/25
USPC ........................................ 707/736, 798, 609
See application file for complete search history.

(56) References Cited

U.S. PATENT DOCUMENTS

| | | | | |
|---|---|---|---|---|
| 6,976,020 B2* | 12/2005 | Anthony | ............. | G06F 40/14 707/999.006 |
| 7,577,671 B2* | 8/2009 | Joshi | ............. | G06F 16/951 707/999.003 |
| 7,908,273 B2 | 3/2011 | DiMaria et al. | | |
| 8,402,413 B2* | 3/2013 | Ohtsuka | ............. | G06F 30/394 716/126 |
| 8,674,993 B1 | 3/2014 | Fleming et al. | | |
| 9,031,911 B2* | 5/2015 | Bachar | ............. | G06F 16/2237 707/640 |
| 10,248,622 B2* | 4/2019 | Verma | ............. | G06F 16/24561 |
| 2003/0069908 A1* | 4/2003 | Anthony | ............. | G06F 16/258 715/251 |
| 2006/0235858 A1* | 10/2006 | Joshi | ............. | G06F 16/951 707/E17.108 |
| 2008/0077613 A1 | 3/2008 | Hay et al. | | |
| 2010/0235804 A1* | 9/2010 | Ohtsuka | ............. | G06F 30/394 716/137 |
| 2012/0209886 A1* | 8/2012 | Henderson | ............. | G06F 16/273 707/798 |
| 2012/0331411 A1* | 12/2012 | Dempsey | ............. | G06F 3/048 715/764 |
| 2013/0325808 A1* | 12/2013 | Bachar | ............. | G06F 16/2237 707/640 |
| 2014/0280362 A1 | 9/2014 | Henderson | | |
| 2015/0026158 A1 | 1/2015 | Jin | | |
| 2016/0292220 A1* | 10/2016 | Verma | ............. | G06F 16/24561 |

\* cited by examiner

Primary Examiner — Phong H Nguyen
(74) Attorney, Agent, or Firm — Holland & Hart LLP

(57) ABSTRACT

Systems and methods for multiple updates to a database using paths is disclosed. Updates to a graph database can be performed by associating an attribute node, that stores the updated value, to the entity node to-be updated. When the entity node is queried for the value, the nearest attribute node is identified using a shortest path determination.

20 Claims, 12 Drawing Sheets

MULTIPLE DATABASE UPDATES USING PATHS

TECHNICAL FIELD

The subject matter disclosed herein relates generally to improved database management and, more particularly, but not by way of limitation, to performing multiple updates in a database using paths.

BACKGROUND

In recent years, the amount of information to be tracked using databases has greatly increased. In some cases, graph databases are used to track the information. Graph databases track data items using nodes, which can be connected by edges (e.g., lines). While graph databases can be useful for tracking information, updating values in graph databases can require multiple database transactions (e.g., multiple trips to the database), thereby causing increased computational and network resource usage. As is evident, there is a demand for efficient approaches for updating values in databases.

BRIEF DESCRIPTION OF THE DRAWINGS

Some example embodiments are illustrated by way of example and not limitation in the figures of the accompanying drawings.

DETAILED DESCRIPTION

Figure 1:
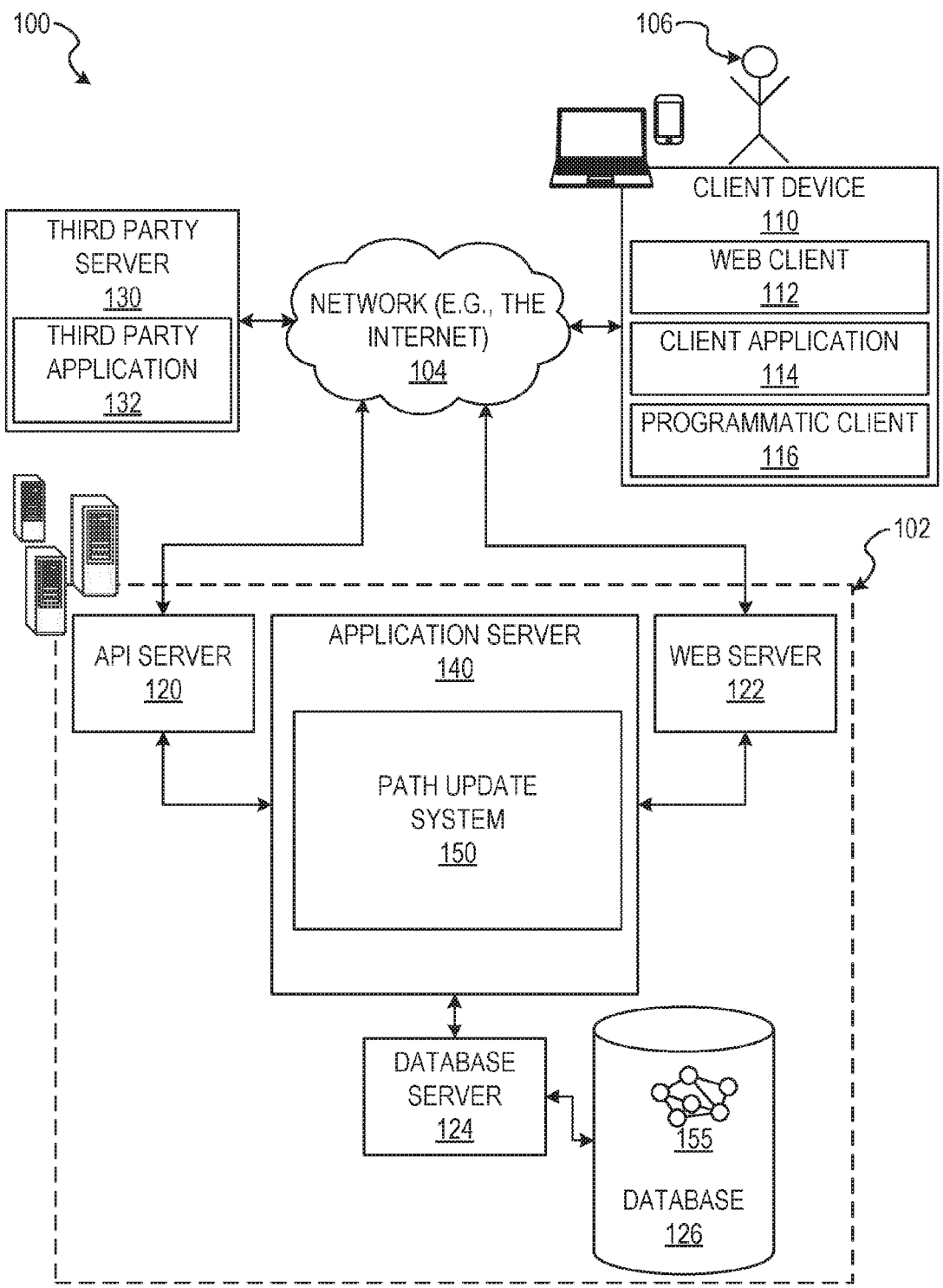
FIG. 1 is a block diagram illustrating various functional components of a path update system, according to some example embodiments.

In the following description, for the purposes of explanation, numerous specific details are set forth in order to provide an understanding of various example embodiments of the present subject matter. It will be evident, however, to those skilled in the art, that the example embodiments of the present subject matter may be practiced without these specific details.

In various example embodiments, a database, such as a graph database can be more efficiently updated using path based updates. A graph database is a database comprising nodes that are connected by edges, e.g., lines. Nodes may be of different types, such as entities nodes and attribute nodes. In some example embodiments, an entity node can be used to a track database item (e.g., row, record, tuple), and attribute nodes can be store attributes or properties of the database item. The attributes of a given entity node can depend on which attribute nodes are associated or connected to the given entity node via edges. For example, a vehicle entity node may be connected via edges to three attribute nodes: a first Make attribute node, having a value of "Toyota"; a second. Model attribute node, having a value of "4Runner"; and a third color attribute node, having a value of "Black". Accordingly, in this example, the database item being tracked corresponds to a vehicle that is a black Toyota 4Runner.

In some example embodiments, the graph database comprises nodes of a single type, and attributes are tracked by edges that specify relationships between nodes that the corresponding edges connect. For example, a graph database may comprise four nodes, a vehicle node, a Toyota node, a 4Runner node, and a black node. To track or store a database item for the same black Toyota 4Runner, the vehicle node is connected to the Toyota node by an edge having the relationship value of "Has Make", the vehicle node is further connected to the 4Runner node by an edge having the relationship value of "Has Model", and the vehicle node is further connected to the color node by an edge having the relationship value of "Has Color". In either example embodiment, each node may have further data that is stored with the node, but not necessarily displayable. For example, the "vehicle" node may have an identifier (e.g., key) that uniquely identifies an individual vehicle node, or identifies all nodes in the same class (e.g., all vehicle nodes). For illustrative purposes, the database discussed herein is a graph database having entity nodes and attribute nodes, database items correspond to entities nodes, and attributes of the database items are stored in attribute nodes that are connected to entity nodes to define attributes of respective entity nodes, according to some example embodiments. Though, it is appreciated to one of ordinary skill in the that the approaches disclosed can further be implemented in other types of databases in a similar manner.

In some example embodiments, the connections between a plurality of nodes in a graph database specify a type of parent/child relationship between nodes. Using the example above, the vehicle node can correspond to a parent node, which has three children nodes: the Make node, the Model mode, and the Color node. Child entity nodes can have further child entity nodes. For example, the Model node may have a child node that species that the model type is a "Sport" edition of the 4Runner. In this way, a general hierarchy parent nodes and children nodes can be tracked using a graph database.

In some example embodiments, the relationships between a plurality of nodes in a graph database is more readily represented by groups (e.g., cliques) of nodes, where groups form around the node that has most connections to nearby nodes. Again, in the example above, the Make node, the Model node, the Color node for a group around the vehicle node, as the vehicle node has the most connections of the nodes, it is the center of the clique. The nodes immediately connected to the vehicle node may be considered first degree nodes (e.g., the Make node, the Model node, and color node), and the nodes connected to the first degree nodes, but not connected to the vehicle node may be considered second degree connections (e.g., the Model Type node, which is connected to the Model node). Strictly as an example, and to clearly explain the approaches herein, reference is made throughout to parent/child nodes.

Conventionally, updates to a branch of child nodes required multiple database trips, each of which updates a single child node. The multiple trips incur time, computational, and network resources. To avoid wasting resources, in some example embodiments, a single update request updates a value in a single child node, and subsequent read requests for the child node and children of the child node, find the updated value by calculating the shortest path between a given child node and the node having the updated value. In this way, a single trip (e.g., query) is submitted, and the database system is configured to rely on shortest trip determinations to avoid incorrect results (e.g., returning the wrong value), and avoid collisions (e.g., multiple matching results being returned when the query requested only one result).

In some example embodiments, the child node to be updated is identified as the child node that is parent to the child nodes to be updated (e.g., branch of child nodes to be update). In some example embodiments, the child node to be updated is identified as the child node for which no misreads via shortest path calculations will occur, as explained in further detail below.

With reference to FIG. 1, an example embodiment of a high-level client-server-based network architecture 100 is shown. A networked system 102 provides server-side functionality via a network 104 (e.g., the Internet or wide area network (WAN)) to one or more client devices 110. In some implementations, a user (e.g., user 106) interacts with the networked system 102 using the client device 110. FIG. 1 illustrates, for example, a web client 112 (e.g., a Internet browser), applications 114, and a programmatic client 116 executing on the client device 110. The client device 110 includes the web client 112, the client application 114, and the programmatic client 116 alone, together, or in any suitable combination. Although FIG. 1 shows one client device 110, in other implementations, the network architecture 100 comprises multiple client devices.

In various implementations, the client device 110 comprises a computing device that includes at least a display and communication capabilities that provide access to the networked system 102 via the network 104. The client device 110 comprises, but is not limited to, a remote device, work station, computer, general purpose computer, Internet appliance, hand-held device, wireless device, portable device, wearable computer, cellular or mobile phone, Personal Digital Assistant (PDA), smart phone, tablet, ultrabook, netbook, laptop, desktop, multi-processor system, microprocessor-based or programmable consumer electronic, game consoles, set-top box, network Personal Computer (PC), mini-computer, and so forth. In an example embodiment, the client device 110 comprises one or more of a touch screen, accelerometer, gyroscope, biometric sensor, camera, microphone, Global Positioning System (GPS) device, and the like.

The client device 110 communicates with the network 104 via a wired or wireless connection. For example, one or more portions of the network 104 comprises an ad hoc network, an intranet, an extranet, a Virtual Private Network (VPN), a Local Area Network (LAN), a wireless LAN (WLAN), a Wide Area Network (WAN), a wireless WAN (WWAN), a Metropolitan Area Network (MAN), a portion of the Internet, a portion of the Public Switched Telephone Network (PSTN), a cellular telephone network, a wireless network, a Wireless Fidelity (WI-FI®) network, a Worldwide Interoperability for Microwave Access (WiMax) network, another type of network, or any suitable combination thereof.

In some example embodiments, the client device 110 includes one or more of the applications (also referred to as "apps") such as, but not limited to, web browsers, book reader apps (operable to read e-books), media apps (operable to present various media forms including audio and video), fitness apps, biometric monitoring apps, messaging apps, electronic mail (email) apps, and e-commerce site apps (also referred to as "marketplace apps"). In some implementations, the client application 114 include various components operable to present information to the user and communicate with networked system 102. In some example embodiments, if the The web client 112 accesses the various systems of the networked system 102 via the web interface supported by a web server 122. Similarly, the programmatic client 116 and client application 114 accesses the various services and functions provided by the networked system 102 via the programmatic interface provided by an Application Program Interface (API) server 120.

Users (e.g., the user 106) comprise a person, a machine, or other means of interacting with the client device 110. In some example embodiments, the user is not part of the network architecture 100, but interacts with the network architecture 100 via the client device 110 or another means. For instance, the user provides input (e.g., touch screen input or alphanumeric input) to the client device 110 and the input is communicated to the networked system 102 via the network 104. In this instance, the networked system 102, in response to receiving the input from the user, communicates information to the client device 110 via the network 104 to be presented to the user. In this way, the user can interact with the networked system 102 using the client device 110.

The API server 120 and the web server 122 are coupled to, and provide programmatic and web interfaces respectively to, one or more application server 140. The application server 140 can host a path update system 150, which comprises one or more modules or applications and each of which can be embodied as hardware, software, firmware, or any combination thereof. The application server 140 are, in turn, shown to be coupled to one or more database server 124 that facilitate access to one or more information storage repositories or database 126. In an example embodiment, the database 126 are storage devices that store information to be tracked, e.g., data items in a database. As illustrated, in some example embodiments, database 126 includes at least one graph database 155 comprising nodes connected by edges, as discussed in further detail below. Changes to the graph database may be initiated from the client side, e.g., via user 106, or server side, e.g., via changes made by web server 122.

Additionally, a third party application 132, executing on third party server 130, is shown as having programmatic access to the networked system 102 via the programmatic interface provided by the API server 120. For example, the third party application 132, utilizing information retrieved from the networked system 102, supports one or more features or functions on a web site hosted by the third party. The third party website, for example, may also cause changes to the database 126.

Further, while the client-server-based network architecture 100 shown in FIG. 1 employs a client-server architecture, the present inventive subject matter is, of course, not limited to such an architecture, and can equally well find application in a distributed, or peer-to-peer, architecture system, for example. The various systems of the applications server 140 (e.g., the path update system 150) can also be implemented as standalone software programs, which do not necessarily have networking capabilities.

Figure 2:
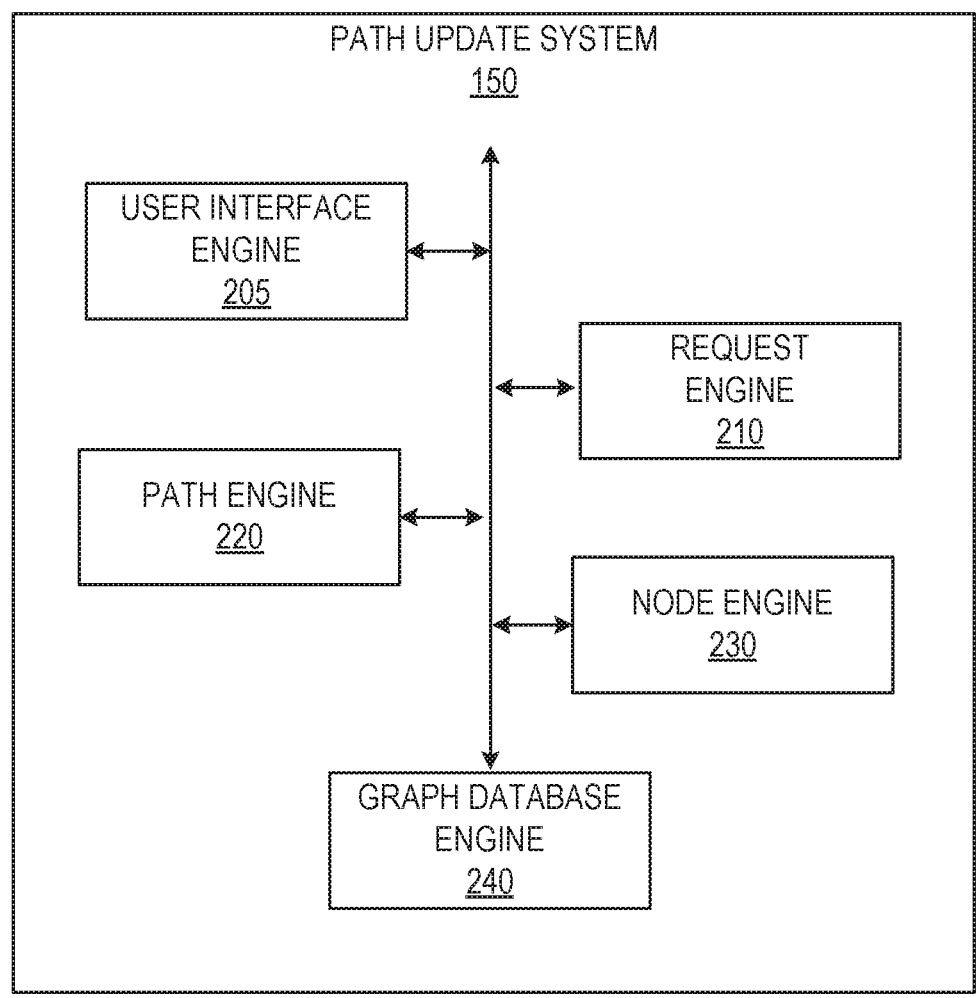
FIG. 2 is a block diagram illustrating various functional modules that form a path update system, according to some example embodiments.

FIG. 2 illustrates a block diagram showing components in the path update system 150, according to some example embodiments. The components themselves are communicatively coupled (e.g., via appropriate interfaces) to each other and to various data sources, so as to allow information to be passed between the applications or so as to allow the applications to share and access common data. Furthermore, the components access one or more database 126 via the database server 124. As illustrated, the path update system 150 comprises a user interface engine 205, a request engine 210, a path engine 220, a node engine 230, and a graph database engine 240, according to some example embodiments.

The request engine 210 manages requests (e.g., queries) for the path update system, 150. In some example embodiments, the request engine 210 receives a request and determines whether the request is an update request, e.g., a request to update a value in the database 126, or whether the request is a read request, e.g., a request to read a value from the database 126. If the received request is an update request, the request engine 210 passes the request to the node engine 230 for further processing. The node engine 230 manages creation of new attribute nodes to store an updated value, association of a new attribute node with an existing entity node in a database. In some example embodiments, the node engine 230 interfaces with the graph database engine 240 to perform updates on a graph database managed by the graph database engine 240. The graph database engine 240 manages the storage and database operations of a graph database. In some example embodiments, the node engine 230 is configured to determine logic operations, such as determining where to create a new node, and the graph database engine 240 follows instructions from the node engine 230 to insert new nodes, make associations between nodes connections between nodes), and modify values of nodes.

According to some example embodiments, if the request engine 210 receives a read request, the request engine 210 passes the request to the path engine 220. The path engine 220 is responsible for identifying an entity node that is specified in the read request, identify an identifier for an attribute node that stores the value being requested, and calculate the shortest path to the nearest attribute node that has the requested value. The path engine 220 then instructs the graph database engine 240 to retrieve the value stored in the identified nearest attribute node, and return it as a result for the read request. Although, in the example embodiment illustrated in FIG. 2 shows the graph database engine 240 as integrated in the path update system 150, in some example embodiments, the graph database engine 240 is integrated into database server 124, which is communicatively coupled to the path update system 150, as shown in FIG. 1.

Figure 3A:
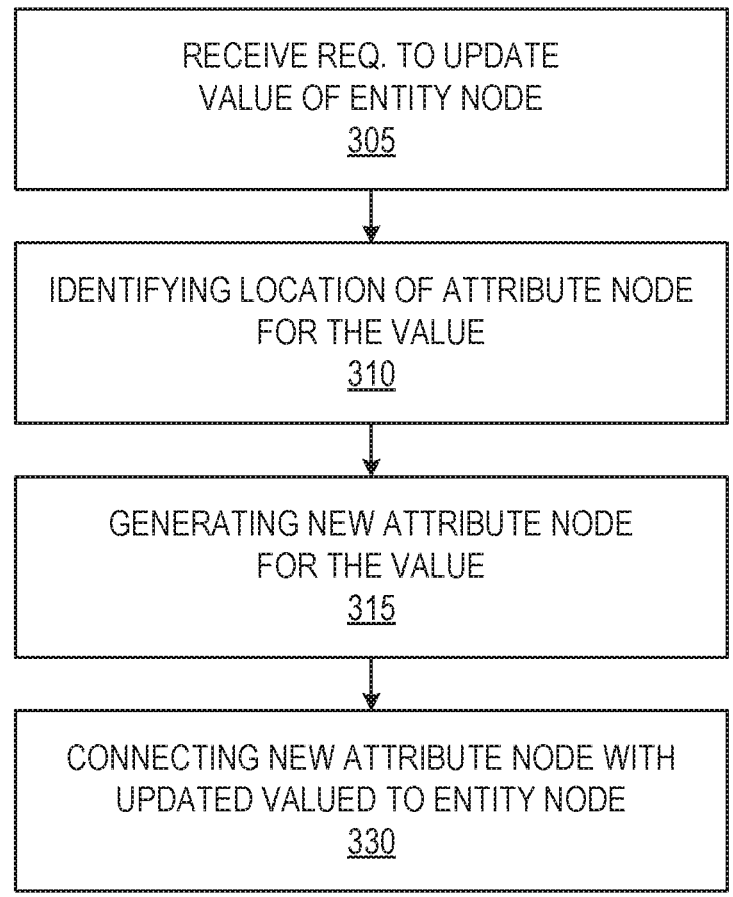
FIG. 3A-3C illustrate flow diagrams for methods of path based database operations, according to some example embodiments.

FIG. 3A illustrates a flow diagram for a method 300 for multiple updates of a database through path based updates, according to some example embodiments. At operation 305, the request engine 210 receives a request to update the value of an entity node. The request engine 210 passes the update request to the node engine 230. At operation 310, the node engine 230 identifies the location of the attribute node that stores the value to be updated. For example, the attribute node that stores the value to be updated may be associated with a parent node of the entity node to be updated. At operation 315, the node engine 230 generates a new attribute node to store the new value specified in the update request. At operation 330, the node engine 230 instructs the graph database engine 245 to connect the new attribute node to the entity node. The path update system 150 is configured to handle future queries to the entity node or children of the entity node using the shortest path scheme, according to some example embodiments. For example, when future queries requesting the value for the entity node or the children nodes are received, a shortest path calculation indicates that the attribute node created at operation 315 is the nearest attribute node, and thus the value stored in that attribute node is returned as the query result. In this way, the entity node and all children are updated and multiple database trips are avoided. In some example embodiments, operations 315 and 330 can be performed in one operation that specifies a new node to be created, specifies the value to be stored in the new node, and specifies where the new node should be inserted (e.g., species to which entity node to connect the new attribute should connect via an edge).

Figure 3B:
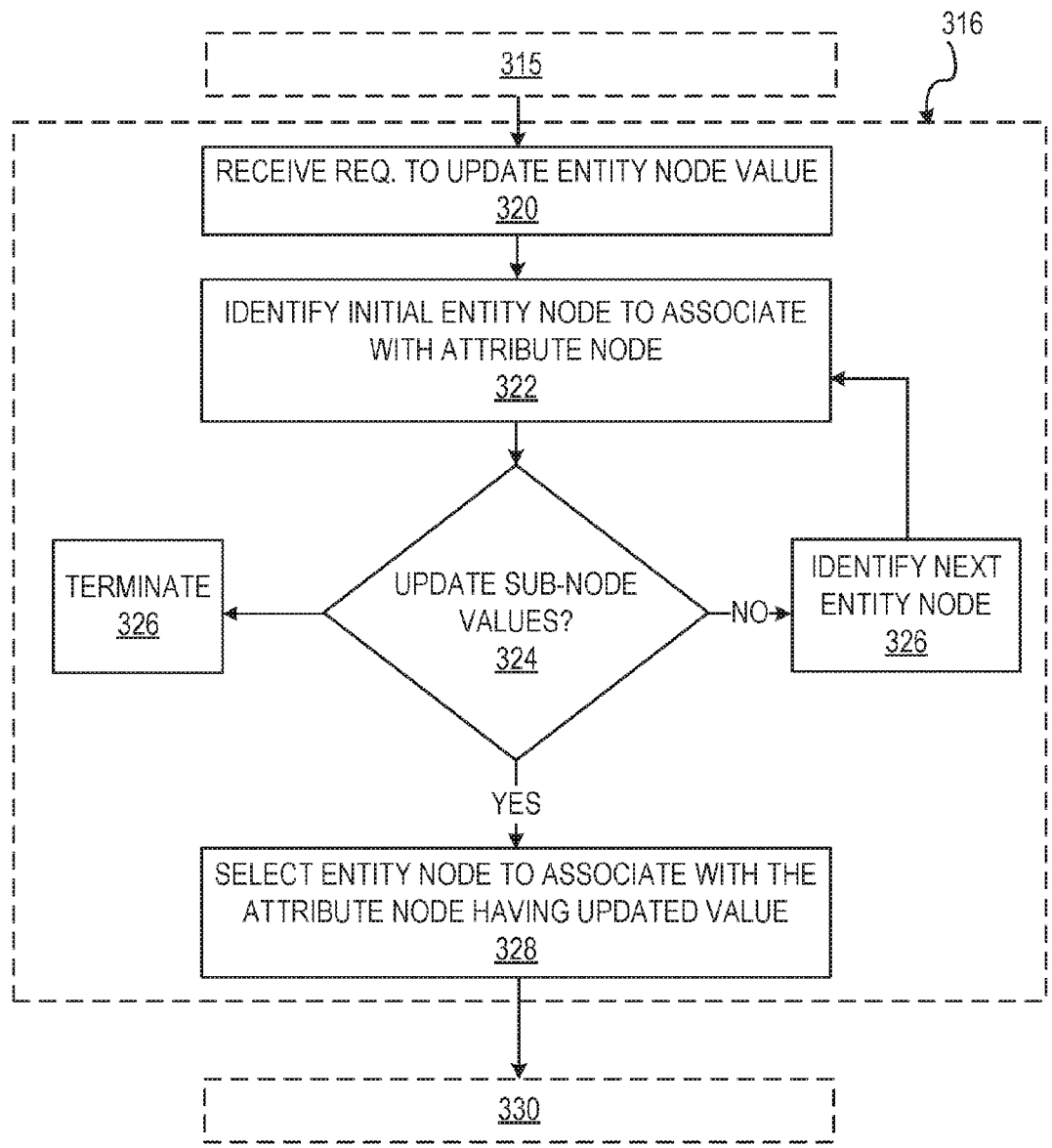

FIG. 3B illustrates a flow diagram for a method 316, which may be performed as subroutine between operations 310 and 330, according to some example embodiments. Inserting the newly created attribute node in the incorrect place within a graph database can inadvertently cause updates to nearby nodes that are not supposed to receive updates. To avoid incorrect updates to nodes, method 316 identifies the appropriate node with which to associate the newly created attribute node. Method 316 can be implemented in at least three ways to identify the entity node that the newly created attribute node should attach to: (1) receiving, from a user, selection of a entity node to attach the attribute node to, (2) selecting the parent entity node and checking for each nodes between parent and child whether attaching the attribute node will cause incorrect updates, and (3) selecting the initially identified entity node (e.g., initially identified in the update request) and checking for each node, between the child node and the parent node, whether attaching the attribute node will cause incorrect updates.

In the first case, at operation 320 the node engine 320 receives, from a user, selection of an entity node to updated by attaching the newly created attribute node. At operation 322, the initial entity node to associate with the attribute node is the node selected by the user. At operation 324, the node engine 230 checks whether any nearby nodes will be improperly updated by attaching the attribute node to the entity node. In some example embodiments, this is performed by checking nearby nodes to see whether they are read only or unmodifiable. If some of the nodes will be incorrectly updated, then the update operation is terminated at operation 325. In some example embodiments, at operation 325, an error message issued to the user notifying that the update operation requested will cause improper node updates. However, assuming at operation 324 all nodes are read/write or otherwise modifiable, then at operation 328 the node selected by the user is selected as the node to attach the attribute node to and the operation returns to operation 330 of FIG. 3A.

In the second case, at operation 320, the node engine 230 receives, from a user or machine, selection of an entity node to be updated. At operation 322, the node engine 230 identifies the parent node with which the current attribute node is currently connected. At operation 322, the next entity node between the parent node and the child node (e.g., the node identified in the update operation of 305 in FIG. 3A) is identified as the next entity node. At operation 324, the next entity node is checked to determine whether connecting the node to next entity node will cause improper updates (e.g., by checking whether nearby nodes are read only). If attaching the new attribute node to the next entity node will cause improper updates, then at operation 326, an additional next entity node is identified. The additional next entity node is the next node on the path between the parent entity node and the child entity node. The process loops to operation 324 for each node until the child node is the next node, at which point at operation 328 the child node is selected as the node to be associated with the new attribute node.

In the third case, at operation 320, the node engine 230 receives, from a user or machine, selection of an entity node to be updated. At operation 322, the node engine 230 identifies the next entity node connected to the child node on the way to the parent node. At operation 324, the initial entity node is checked to determine whether connecting the node to initial entity node will cause improper updates (e.g., by checking whether nearby nodes are read only). If attaching the new attribute node to the initial entity node will cause improper updates, then at operation 326, a next entity node is identified. The next entity node is the next node on the path between the child entity node and the parent entity node. The process loops to operation 324 for each node until the parent node is the next node, at which point at operation 328 the parent node is selected as the node to be associated with the new attribute node.

Figure 3C:
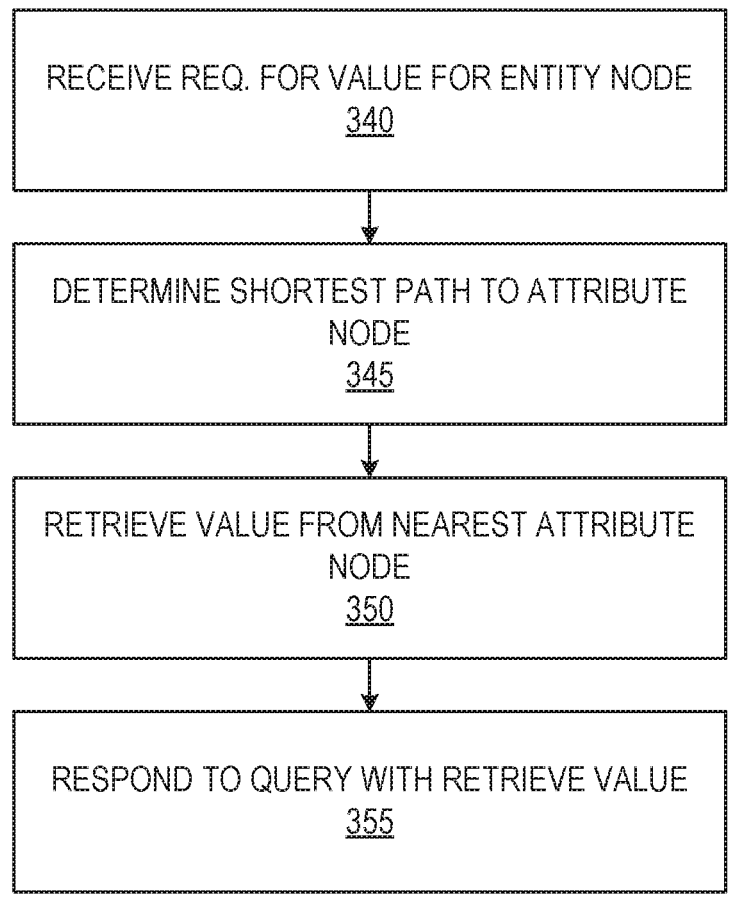

FIG. 3C illustrates a flow diagram for a method 330 of handling queries using paths, according to some example embodiments. As explained, multiple database trips for multiple updates is avoided by intelligently selecting the which node to attach the attribute node, and then processing future queries using a shortest path scheme to find the nearest attribute node, according to some example embodiments. At operation 340, the request engine 210 receives a request to read a value of an entity node in a graph database. The request engine 210 determines that the request is a read request, passes the request to the path engine, 220. At operation 345, the path engine 220 determines the shortest path to the attribute node. At operation 350, the path engine 220 passes the identified node, which is the node closest to the entity node, to the graph database engine 240. At operation 350, the graph database engine 240 retrieves the value from the nearest attribute node determined from the shortest path determination. At operation 355, the graph database engine 240 responds to the query with the value retrieved from the nearest attribute node.

Figure 4A:
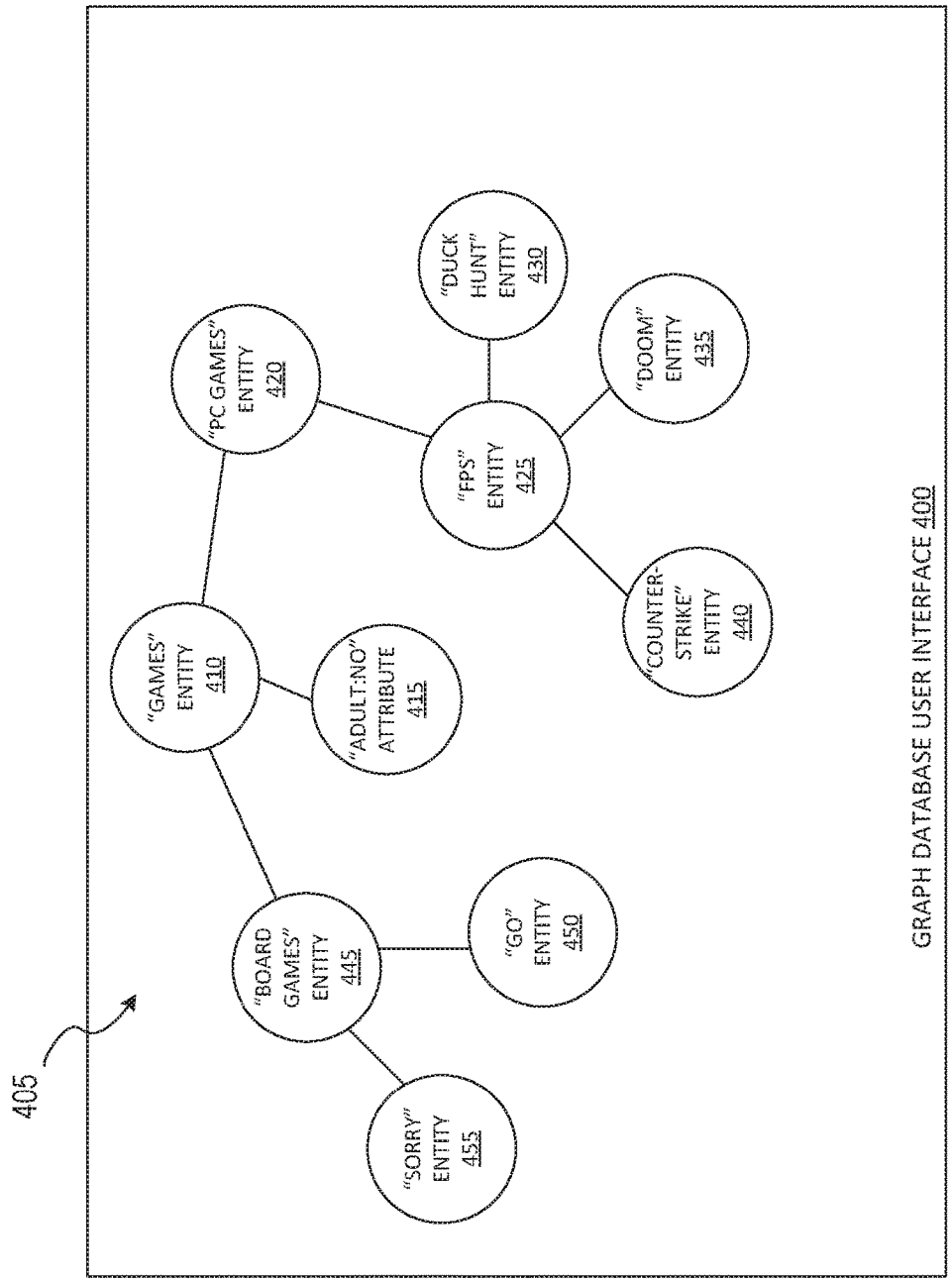
FIGS. 4A and 4B illustrate an example graph database structure being updated by a shortest path scheme, according to some example embodiments.
Figure 4B:
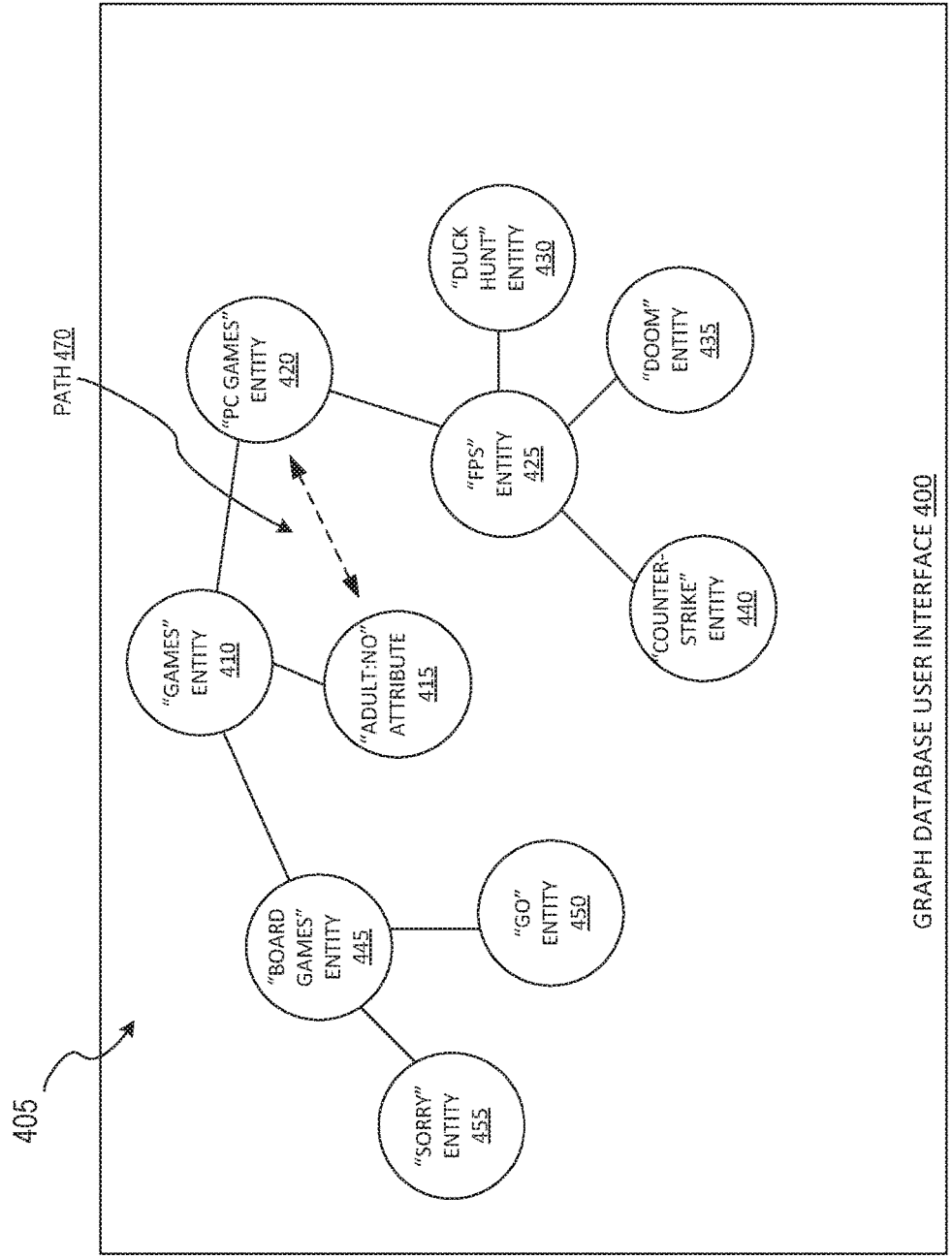

FIGS. 4A and 4B illustrate an example graph database structure 405 being updated by a shortest path scheme, according to some example embodiments. In some example embodiments, the graph database structure may generated for display on a graph database user interface 400 generated by user interface engine 205. The graph database user interface 400 is displayable on a client device display screen, such as a display screen of client device 110. Though it is appreciated, that in some example embodiments, the graph database structure need not be displayed visually in a user interface for the approaches described herein to be implemented.

As illustrated in FIG. 4A, the graph data structure 405 comprises entity nodes (e.g., games entity node 410) and an attribute node (e.g., adult attribute node 415) connected by edges. The edges are depicted as solid lines that connect the nodes, which are depicted as circles. The example graph data structure 405 illustrated in FIG. 4A is managing categories of game data items, including board games and PC (personal computer) games.

As discussed above, an entity node is a node that represents data item to be tracked in the graph database structure 405. An attribute node connected to a given entity node assigns the value stored in the attribute node to the connected entity node. An attribute node connected to a given entity node can further assign the value stored in the attribute node to nodes nearby to the given entity node based on shortest path calculations as discussed herein. An entity node can be a parent to other entity nodes, or a child to other entity nodes. For example, the games entity node 410 is the parent node of all nodes in the graph database structure 405. The board games entity node 445 is a sub-node or child node of the games entity node 410. Under the board games entity node 445 are two further sub-node entity nodes, the Sorry entity node 455, and Go entity node 450; both Son and Go are types of board games being categorized as games per the games entity node 410 being a parent of the Sorry entity node 455 and the Go entity node 450, and are further being categorized as board games per the board games entity node 445 being a parent of the of the Sorry entity node 455 and the Go entity node 450.

Likewise, the games entity node 410 is a parent node to the PC games entity node 420, which is in turn a parent node to the FPS entity node 425, which is in turn a parent to three further entity nodes: the Counter Strike entity node 440, the DOOM entity node 435, and Duck Hunt entity node 430, which are types of PC games that are first-person shooters.

As further shown in the graph database structure 405, attributes can be tracked for the entity nodes by an attribute node, such as attribute node 415. Attribute node 415 tracks whether games are adult-oriented or not; a "yes" value indicates that the connected entity nodes (and potential nearby entity nodes) are adult oriented, similarly a "no" value indicates that the connected entity node (and potential nearby entity nodes) are not adult oriented.

Conventionally, each node to have an attribute tracked had an attribute node connected to the entity node for which the attribute is assigned. For example, in order to assign Counter Strike entity node 440 as an adult-oriented game, an adult attribute node with the value of "yes" would have to be directly connected to the Counter Strike entity node 440. If a query requests whether Counter Strike is an adult-oriented game, conventionally, the database system would return the value of the adult attribute node directly connected entity node. Conventionally, if multiple updates to multiple nodes is to be performed, e.g., updating the value of an attribute node connected to each of the multiple nodes to be updated. As discussed, this can cause multiple database trips, and extensive backend operations that cause computational overhead.

FIG. 4B illustrates an example embodiment involving determining the shortest path to read a value in the graph database structure 405, according to some example embodiments. As an illustrative example is explained here with reference to FIG. 3C. As an example, assume a query is received that asks whether the PC games in the graph data structure 405 are adult-oriented or not. The path engine 220 receives the request, determines that the PC games entity node is being queried for the adult attribute. The path engine 220 then performs a shortest path determination that is configured to determine which adult attribute node is nearest to the queried PC games entity node. As discussed above, the adult attribute node may be identified by an identifier that is a class identifier for all attribute nodes. Thus, the path engine 220 may perform a shortest path determination to determine which node having the identifier (and thus being a attribute node) is nearest to the queried PC games node 420. From the shortest path determination, the attribute node 415, which is connected to the games entity node 410 is determined to be nearest, as indicated by path 470. The path engine 220 may pass the identified node, attribute node 415, to the graph database engine 240, which retrieves the value of "no" as a query result. Thus indicating that the PC games are stored in the graph database structure 405 are not adult-oriented.

Figure 5A:
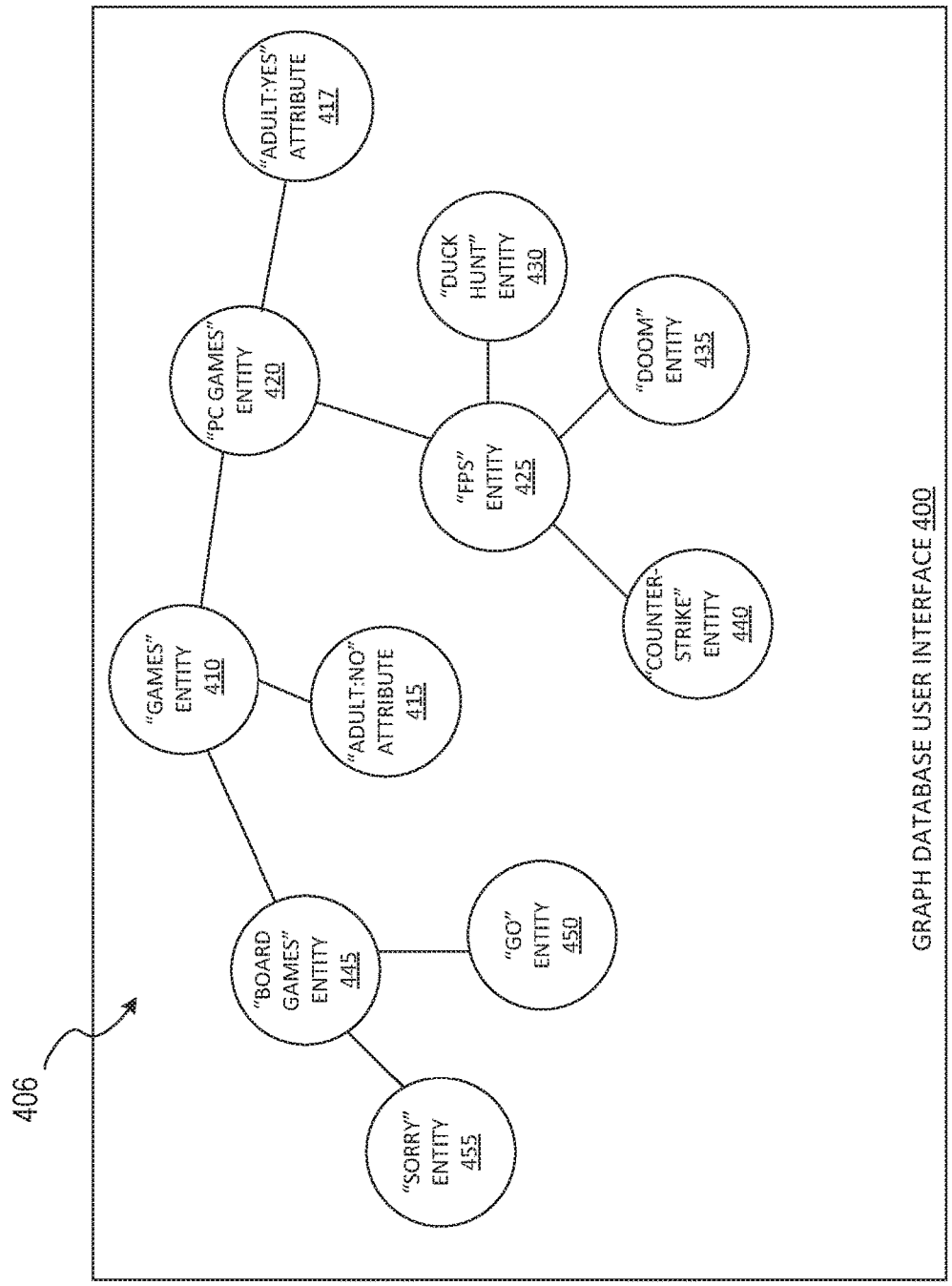
FIG. 5A-5C illustrate graph data structures updated using path based updates, according to some example embodiments.
Figure 5B:
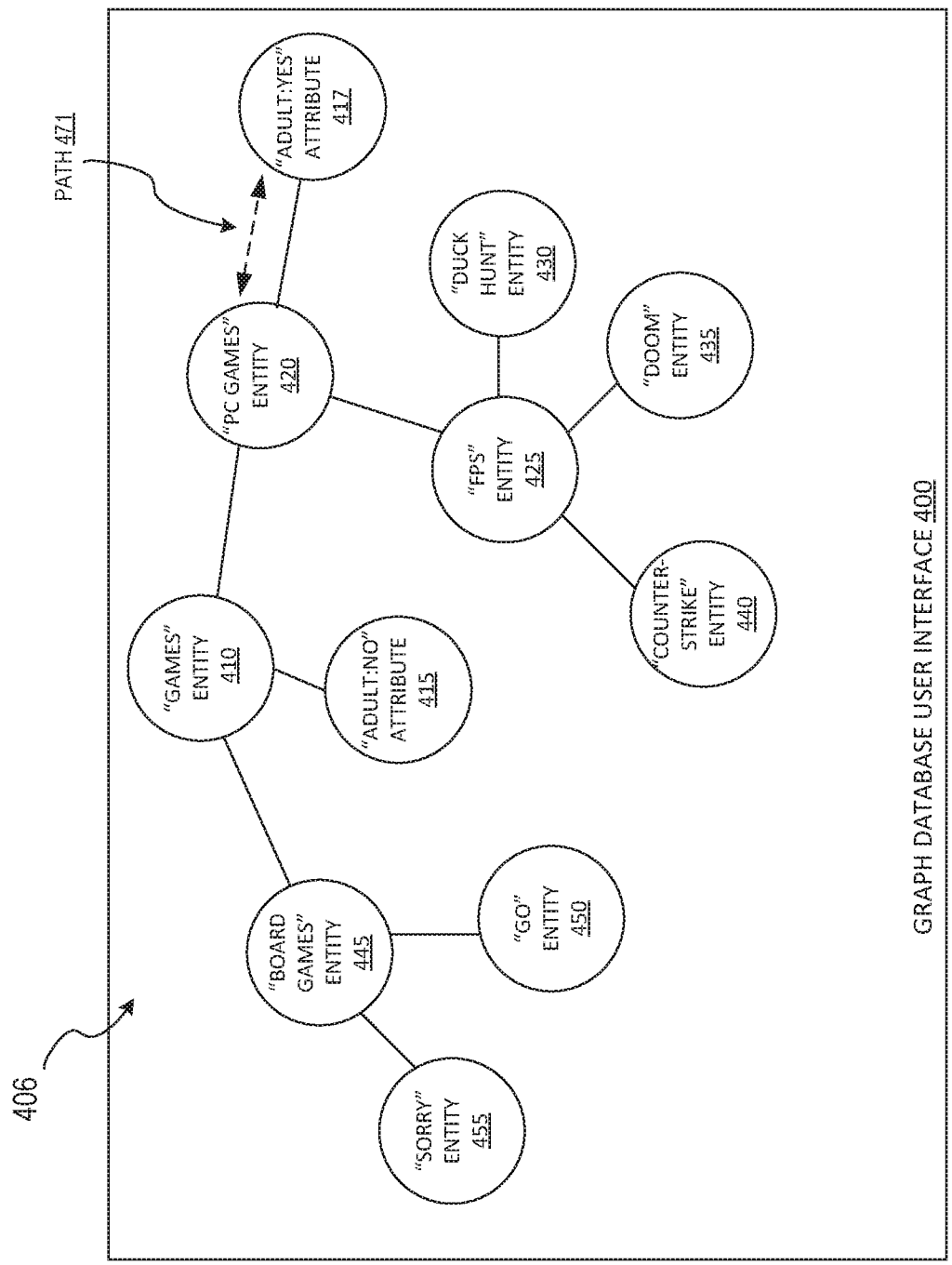
Figure 5C:
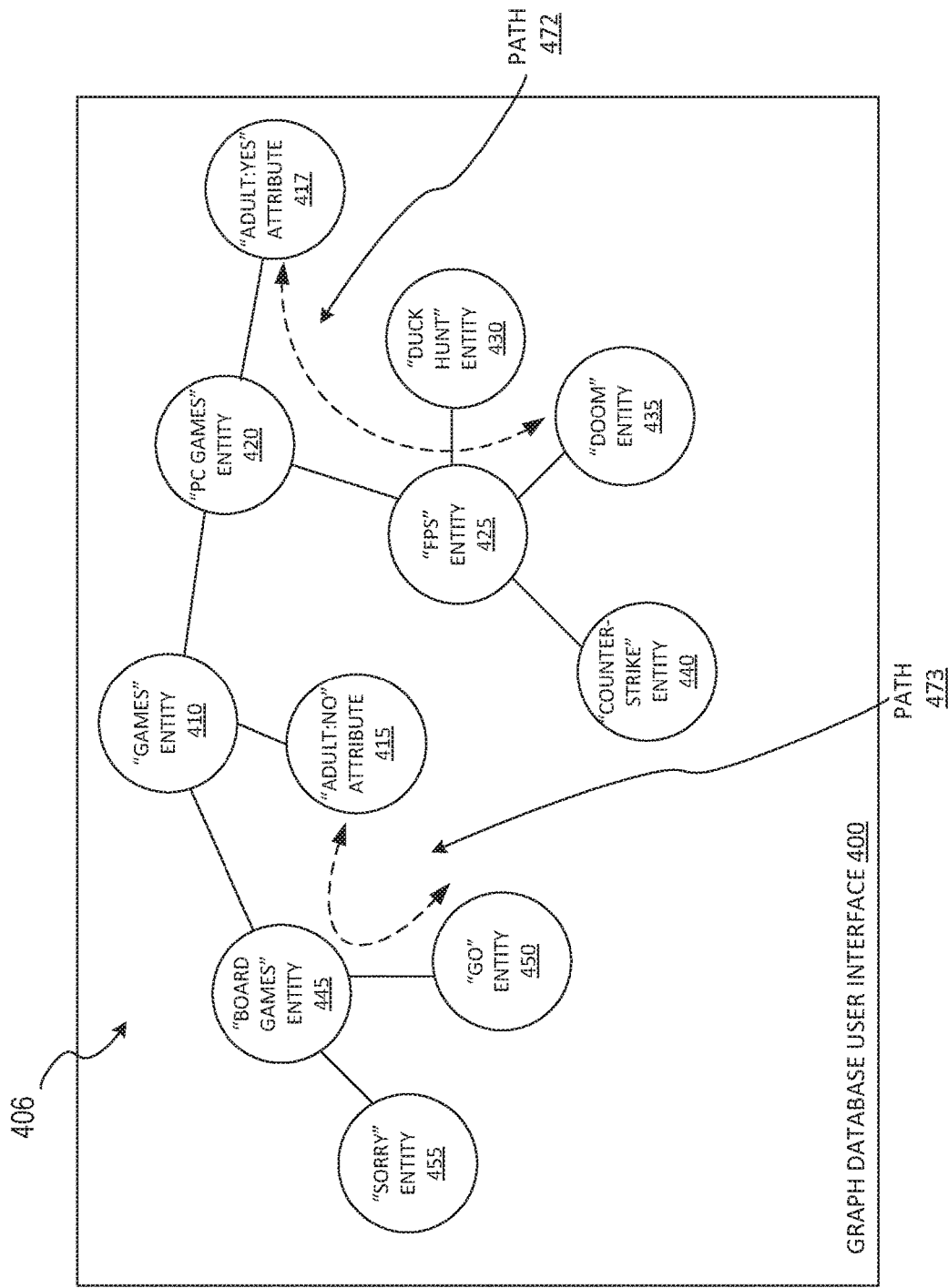

FIG. 5A-5C illustrate example embodiments for updating a value in the graph data structure 405, according to some example embodiments. Assuming, as an example, the request engine 210 receives a update request requesting that all PC games have their adult-oriented attribute be updated to "yes", to indicate that all PC games in the database are adult oriented games. As a result, the node engine 230 generates a new adult attribute, adult attribute node 417, and stores a value of "yes" in the adult attribute node 417. The graph database engine 417 associates the adult attribute node 417 with the PC games entity node 420 by connecting them via an edge (e.g., line), as illustrated in FIG. 5A according to some example embodiments.

With reference to FIG. 5B, after graph database structure 406 is updated, assume a read query asks whether the PC games in the database are adult oriented or not. The path engine 220 identifies the queries node, PC games entity node 420, and calculates the shortest path to the nearest attribute node. As a result, path 471 is determined and the directly connected attribute node 417 is identified as the nearest adult attribute node. As discussed, the graph database engine 240 then retrieves the "yes" value and returns the value as a result for the read query, thereby indicating that all PC games are indeed adult oriented.

With reference to FIG. 5C, further assume a read query asks whether a specific FPS game, Doom, is adult oriented or not. To retrieve the result, the path engine 220, identifies the node that matches or otherwise corresponds to the query, here the node that matches the query is the doom entity node 435. The path engine 220 uses a shortest path calculation to again identifier attribute node 417 as the nearest attribute node. The graph database engine 240 retrieve the value from attribute node 417 ("yes") and returns it as a returns it as a query result, thereby indicating that indeed yes, Doom is an adult oriented game.

In updating the PC games as adult oriented, the path update system 1450 did not remove or change the value of adult attribute node 415. Thus, as a further example, assume a read request asks whether Go the game is adult oriented or not. The path engine 220 then identifies the matching node being queried as Go entity node 450, and calculations the shortest path to the nearest adult attribute node 415, for example using a class identifier and determining the path to the nearest node having the class identifier). As a result, shortest path 473 is identified, which indicates the nearest attribute node is adult attribute node 415. Graph database engine 240 then retrieves the value from attribute node 415 of "no", and returns the value as a query result, thereby indicating that Go is not an adult-oriented game, according to some example embodiments. In this way, multiple updates are made in a single operation, e.g., associating the PC entity node 420 with attribute node 417 updates entity nodes 420, 425, 430, 435, and 440, because future queries are configured to calculated the shortest path to attribute nodes being sought.

Figure 6:
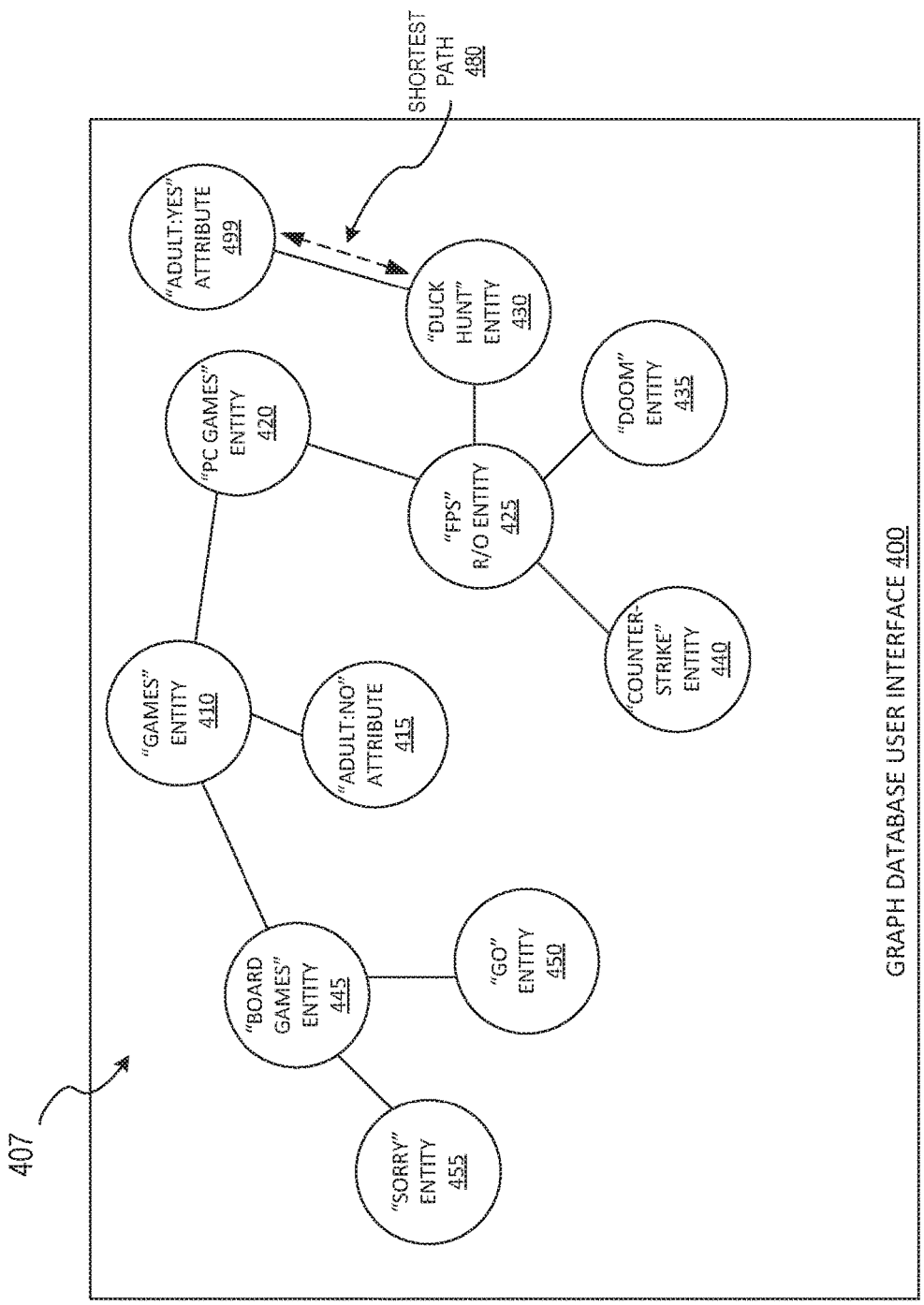
FIG. 6 illustrates a graph data structure updated using a path based update, according to some example embodiments.

FIG. 6 illustrates a graph database structure 407 updated by performing checks, according to some example embodiments. As discussed with reference to FIG. 3B, in some example embodiments, the node engine 220 receives an update request and performs checks before updating nodes. Assume for example, and update request requests that the PC games be updated to adult oriented. The node engine 220 may first check whether attaching a new attribute node to PC games 420 will cause improper sub-node updates. For example, in attempting to connect a new attribute node to PC games entity node 420, the node engine 220 may first check (e.g., at operation 324) whether the nearby nodes—including FPS entity node 425, the counter strike entity node 440, the Doom entity node 435, and the Duck Hunt entity are all modifiable (e.g., not read-only). If the FPS entity node 425 is read only (as illustrated with "R/O"), the update operation terminates, as illustrated at operation 326. Further, an error notification may be issued to explaining that the update cannot continue because non-modifiable node will be affected by the update.

In a further example, with reference to FIG. 6, assume Duck Hunt entity node is to be updated with an "yes" adult oriented value. Thus, the node engine 230, according to some examples, first identifies that the child node to be updated is the Duck Hunt entity node 430, then further identifies the parent node having the original attribute node as games entity node 410. According to some example embodiments, in order to maximize the affect of an update, at operation 322 the PC games entity node 420 is checked to determine whether the node is read-only, assuming it is read only, the FPS entity node is identified at operation 326. Again assume the FPS entity node is read only. In which case, the node engine determines that the attribute node should be directly connected to Duck Hunt entity node 430. As such, the graph database engine 240 associates the newly generated attribute node 499 with the Duck Hunt entity node 499. In some example embodiments, the checks are performed in the reverse order, from the child entity node to be updated to the parent node, to find the node to attach the attribute node to. In some example embodiments, once a node is selected as the node to be updated, the node engine 220 instructs the path engine 220 to perform one or more shortest path calculations to determine the correct placement of the attribute node (e.g., the correct entity node to attach the attribute node to).

As explained, though the nodes here are referenced as parents and children to one another, they can, according to some example embodiments also be referenced by network graph terminology, using degrees or distances from one another to specify node relations. For example, the FPS entity node 425 is a child of games entity 410 in parent-child terminology, but using network graph terminology, the games FPS entity node 425 is a second degree connection to games entity node 410, by wave of PC games entity node 420 (which is a first degree connection to the PC games entity node 410). Accordingly, the shortest path update system can have different effects in graph data structures that are not necessarily hierarchical in structure, but that are better represented through degree terminology. In those embodiments using network graph terminology, the shortest path approaches disclosed herein are beneficial in causing multiple updates to occur to entire groups or cliques of nodes in a single update operation.

Figure 7:
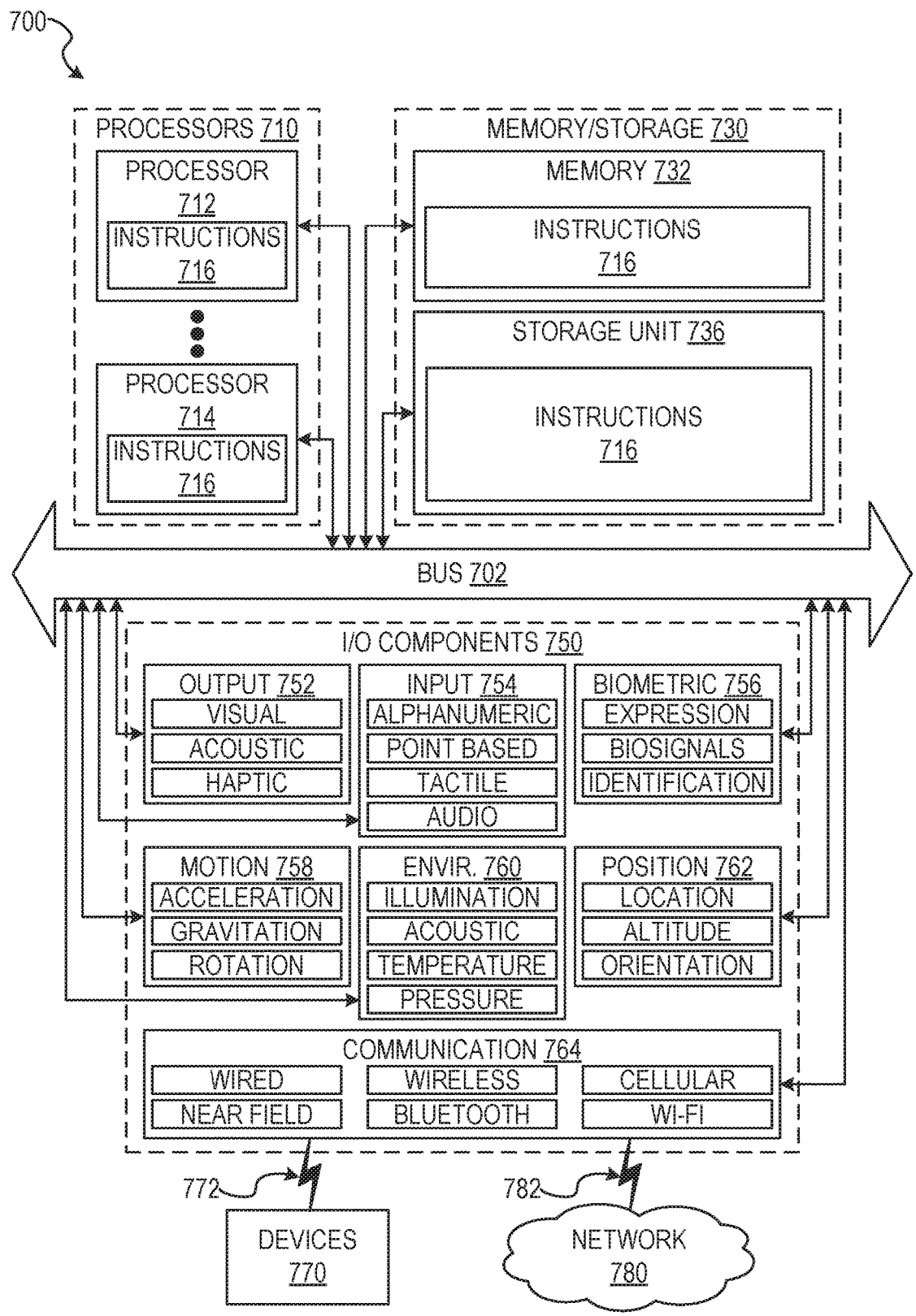
FIG. 7 is a block diagram illustrating components of a machine, according to some example embodiments, able to read instructions from a machine-readable medium and perform any one or more of the methodologies discussed herein.

FIG. 7 is a block diagram illustrating components of a machine 700, according to some example embodiments, able to read instructions from a machine-readable medium (e.g., a machine-readable storage medium) and perform any one or more of the methodologies discussed herein. Specifically, FIG. 7 shows a diagrammatic representation of the machine 700 in the example form of a computer system, within which instructions 716 (e.g., software, a program, an application, an applet, an app, or other executable code) for causing the machine 700 to perform any one or more of the methodologies discussed herein can be executed. For example, the instructions 716 can cause the machine 700 to execute the flow diagrams of FIGS. 3A-3C. Additionally, or alternatively, the instruction 716 can implement the user interface engine 205, request engine 210, path engine 220, node engine 230, and graph database engine 240 of FIG. 2, and so forth. The instructions 716 transform the general, non-programmed machine into a particular machine programmed to carry out the described and illustrated functions in the manner described. In alternative embodiments, the machine 700 operates as a standalone device or can be coupled (e.g., networked) to other machines. In a networked deployment, the machine 700 may operate in the capacity of a server machine or a client machine in a server-client network environment, or as a peer machine in a peer-to-peer (or distributed) network environment. The machine 700 can comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 716, sequentially or otherwise, that specify actions to be taken by the machine 700. Further, while only a single machine 700 is illustrated, the term "machine" shall also be taken to include a collection of machines 700 that individually or jointly execute the instructions 716 to perform any one or more of the methodologies discussed herein.

The machine 700 can include processors 710, memory/storage 730, and I/O components 750, which can be configured to communicate with each other such as via a bus 702. In an example embodiment, the processors 710 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) can include, for example, processor 712 and processor 714 that may execute instructions 716. The term "processor" is intended to include multi-core processor that may comprise two or more independent processors (sometimes referred to as "cores") that can execute instructions contemporaneously. Although FIG. 7 shows multiple processors 710, the machine 700 may include a single processor with a single core, a single processor with multiple cores (e.g., a multi-core processor), multiple processors with a single core, multiple processors with multiples cores, or any combination thereof.

The memory/storage 730 can include a memory 732, such as a main memory, or other memory storage, and a storage unit 736, both accessible to the processors 710 such as via the bus 702. The storage unit 736 and memory 732 store the instructions 716 embodying any one or more of the methodologies or functions described herein. The instructions 716 can also reside, completely or partially, within the memory 732, within the storage unit 736, within at least one of the processors 710 (e.g., within the processor's cache memory), or any suitable combination thereof, during execution thereof by the machine 700. Accordingly, the memory 732, the storage unit 736, and the memory of the processors 710 are examples of machine-readable media.

As used herein, the term "machine-readable medium" means a device able to store instructions and data temporarily or permanently and may include, but is not be limited to, random-access memory (RAM), read-only memory (ROM), buffer memory, flash memory, optical media, magnetic media, cache memory, other types of storage (e.g., Erasable Programmable Read-Only Memory (EEPROM)) or any suitable combination thereof. The term "machine-readable medium" should be taken to include a single medium or multiple media (e.g., a centralized or distributed database, or associated caches and servers) able to store instructions 716. The term "machine-readable medium" shall also be taken to include any medium, or combination of multiple media, that is capable of storing instructions (e.g., instructions 716) for execution by a machine (e.g., machine 700), such that the instructions, when executed by one or more processors of the machine 700 (e.g., processors 710), cause the machine 700 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 750 can include a wide variety of components to receive input, provide output, produce output, transmit information, exchange information, capture measurements, and so on. The specific I/O components 750 that are included in a particular machine will depend on the type of machine. For example, portable machines such as mobile phones will likely include a touch input device or other such input mechanisms, while a headless server machine will likely not include such a touch input device. It will be appreciated that the I/O components 750 can include many other components that are not shown in FIG. 7. The I/O components 750 are grouped according to functionality merely for simplifying the following discussion, and the grouping is in no way limiting. In various example embodiments, the I/O components 750 can include output components 752 and input components 754. The output components 752 can include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 754 can include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In further example embodiments, the I/O components 750 can include biometric components 756, motion components 758, environmental components 760, or position components 762 among a wide array of other components. For example, the biometric components 756 can include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 758 can include acceleration sensor components (e.g., an accelerometer), gravitation sensor components, rotation sensor components (e.g., a gyroscope), and so forth. The environmental components 760 can include, for example, illumination sensor components (e.g., a photometer), temperature sensor components (e.g., one or more thermometers that detect ambient temperature), humidity sensor components, pressure sensor components (e.g., a barometer), acoustic sensor components (e.g., one or more microphones that detect background noise), proximity sensor components (e.g., infrared sensors that detect nearby objects), gas sensor components (e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 762 can include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 750 may include communication components 764 operable to couple the machine 700 to a network 780 or devices 770 via a coupling 782 and a coupling 772, respectively. For example, the communication components 764 include a network interface component or other suitable device to interface with the network 780. In further examples, communication components 764 include wired communication components, wireless communication components, cellular communication components, Near Field Communication (NFC) components, BLUETOOTH® components (e.g., BLUETOOTH® Low Energy), WI-FI® components, and other communication components to provide communication via other modalities. The devices 770 may be another machine or any of a wide variety of peripheral devices (e.g., a peripheral device coupled via a Universal Serial Bus (USB)).

Moreover, the communication components 764 can detect identifiers or include components operable to detect identifiers. For example, the communication components 764 can include Radio Frequency Identification (RFID) tag reader components, NFC smart tag detection components, optical reader components (e.g., an optical sensor to detect one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 764, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 780 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a WI-FI® network, another type of network, or a combination of two or more such networks. For example, the network 780 or a portion of the network 780 may include a wireless or cellular network, and the coupling 782 may be a Code Division Multiple Access (CDMA) connection, a Global System for Mobile communications (GSM) connection, or other type of cellular or wireless coupling. In this example, the coupling 782 can implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

The instructions 716 can be transmitted or received over the network 780 using a transmission medium via a network interface device (e.g., a network interface component included in the communication components 764) and utilizing any one of a number of well-known transfer protocols (e.g., Hypertext Transfer Protocol (HTTP)). Similarly, the instructions 716 can be transmitted or received using a transmission medium via the coupling 772 (e.g., a peer-to-peer coupling) to devices 770. The term "transmission medium" shall be taken to include any intangible medium that is capable of storing, encoding, or carrying the instructions 716 for execution by the machine 700, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method of updating a graph database including at least two types of nodes, the at least two types of nodes including entity nodes and attribute nodes, the entity nodes organized into a hierarchy of entity nodes, each attribute having a single connection to an entity node, the method comprising:
receiving a request to update an attribute of a child entity node in the graph database from an initial attribute value to a new attribute value, the child entity node inheriting the initial attribute value from a parent entity node in the graph database;
generating, in the graph database, an attribute node specifying the new attribute value and associating the attribute node with the child entity node in the graph database;
receiving a graph database query for a value of the attribute of the child entity node;
determining that the attribute node is nearest to the child entity node that specifies a value of the queried attribute in the graph database; and
responsive to the attribute node being the nearest attribute node to specify a value of the queried attribute, returning the specified value as a response to the graph database query.

2. The method of claim 1, further comprising receiving a second graph database query for a second value of the attribute of the parent entity node, determining a second attribute node specifying a value for the second queried attribute is connected to the parent entity node, and returning the second specified value as a response to the second graph database query.

3. The method of claim 1, wherein the graph database comprises a plurality of nodes including the child entity node, the attribute node, the parent entity node, and a parent attribute node storing the initial attribute value, the parent entity node being a parent of the child entity node.

4. The method of claim 1, wherein the attribute node is associated with the child entity node by connecting the attribute node only to the child entity node using an edge in the graph database.

5. The method of claim 1, further comprising:
receiving an additional graph database query that requests the attribute of an additional child entity node that is in the graph database;
determining that the attribute node is nearest to the additional child entity node; and
responsive to the determining that the attribute node is nearest to the additional child entity node, responding to the additional graph database query with the new attribute value from the attribute node.

6. The method of claim 1, wherein the parent entity node is associated with another attribute node storing the initial attribute value.

7. The method of claim 6, further comprising:
receiving a further graph database query for the attribute of a further child entity node;
determining that the another attribute node is nearer to the further child, entity node than the attribute node; and
in response to determining that the another attribute node is nearer to the further child entity node, responding to the further graph database query with the initial attribute value.

8. A system comprising:
one or more hardware processors of a machine; and
a memory storing instructions that, when executed by the one or more hardware processors, cause the machine to perform operations to update a graph database including at least two types of nodes, the at least two types of nodes including entity nodes and attribute nodes, the entity nodes organized into a hierarchy of entity nodes, each attribute node having a single connection to an entity node, the operations comprising:
receiving a request to update an attribute of a child entity node in the graph database from an initial attribute value to a new attribute value, the child entity node inheriting the initial attribute value from a parent entity node in the graph database;
generating, in the graph database, an attribute node specifying the new attribute value and associating the attribute node with the child entity node in the graph database;
receiving a graph database query for a value for the attribute of the child entity node;
determining that the attribute node is nearest attribute node to the child entity node that specifies a value of the queried attribute in the graph database; and
responsive to the attribute node being the nearest attribute node to specify a value of the queried attribute, returning the specified value value as a response to the graph database query.

9. The system of claim 8, wherein generating the attribute node and associating the attribute node does not modify the initial attribute value of the parent entity node such that the parent entity node, corresponds to the initial attribute value while the child entity node corresponds to the new attribute value.

10. The system of claim 8, wherein the graph database comprises a plurality of nodes including the child entity node, the attribute node, the parent entity node, and a parent attribute node storing the initial attribute value, the parent entity node being a parent of the child entity node.

11. The system of claim 8, wherein the attribute node is associated with the child entity node by connecting the attribute node to the child entity node using an edge in the graph database.

12. The system of claim 8, wherein the operations further comprise:
receiving an additional graph database query that requests the attribute of an additional child entity node that is in the graph database;
determining that the attribute node is nearest to the additional child entity node; and responsive response to the determining that the attribute node is nearest to the additional child entity node, responding to the additional graph database query with the new attribute value from the attribute node.

13. The system of claim 8, wherein the parent entity node is associated with another attribute node storing the initial attribute value.

14. The system of claim 13, the operations further comprising:
receiving a further graph database query for the attribute of a further child entity node;
determining that the another attribute node is nearer to the further child entity node than the attribute node; and
in response to determining that the another attribute node is nearer to the further child entity node, responding to the further graph database query with the initial attribute value.

15. A non-transitory machine-readable storage medium embodying instructions that, when executed by a machine, cause the machine to perform operations to update a graph database including at least two types of nodes, the at least two types of nodes including entity nodes and attribute nodes, the entity nodes organized into a hierarchy of entity nodes, each attribute node having a single connection to an entity node, the operations comprising:
receiving a request to update an attribute of a child entity node in the graph database from an initial attribute value to a new attribute value, the child entity node inheriting the initial attribute value from a parent entity node in the graph database;
generating, in the graph database, an attribute node specifying the new attribute value and associating the attribute node with the child entity node in the graph database;
receiving a graph database query for a value for the attribute of the child entity node;
determining that the attribute node is nearest attribute node to the child entity node that specifies a value of the queried attribute in the graph database; and
responsive to the attribute node being the nearest attribute node to specify a value of the queried attribute, returning the specified value as a response to the graph database query.

16. The non-transitory computer-readable storage medium of claim 15, wherein generating the attribute node and associating the attribute node does not modify the initial attribute value of the parent entity node such that the parent entity node corresponds to the initial attribute value while the child entity node corresponds to the new attribute value.

17. The non-transitory computer-readable storage medium of claim 15, wherein the attribute node is associated with the child entity node by connecting the attribute node to the child entity node using an edge in the graph database.

18. The non-transitory computer-readable storage medium of claim 15, wherein the parent entity node is associated with another attribute node storing the initial attribute value, the operations further comprising:
receiving a further graph database query for the attribute of a further child entity node;
determining that the another attribute node is nearer to the further child, entity node than the attribute node; and
in response to determining that the another attribute node is nearer to the further child entity node, responding to the further graph database query with the initial attribute value.

19. The non-transitory computer-readable storage medium of claim 18, wherein the graph database comprises a plurality of nodes including the child entity node, the attribute node, the parent entity node, and a parent attribute node storing the initial attribute value, the parent entity node being a parent of the child entity node.

20. The method of claim 1, wherein the determining that the attribute node is the nearest attribute node to the child entity node comprises evaluating one or more non-ancestor entity nodes for a connection to the nearest attribute node.

* * * * *